United States Patent
Morel et al.

(10) Patent No.: US 9,676,313 B2
(45) Date of Patent: Jun. 13, 2017

(54) STORAGE COMPARTMENT FOR A VEHICLE PROVIDED WITH A MOVABLE PARTITION MEMBER

(71) Applicant: FAURECIA INTERIEUR INDUSTRIE, Nanterre (FR)

(72) Inventors: Jean-Pierre Morel, Boissy L'Aillerie (FR); David Pereira, Frechen (DE)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 116 days.

(21) Appl. No.: 14/406,437

(22) PCT Filed: Jun. 11, 2013

(86) PCT No.: PCT/FR2013/051361
§ 371 (c)(1),
(2) Date: Dec. 8, 2014

(87) PCT Pub. No.: WO2013/186484
PCT Pub. Date: Dec. 19, 2013

(65) Prior Publication Data
US 2015/0151661 A1    Jun. 4, 2015

(30) Foreign Application Priority Data
Jun. 15, 2012 (FR) .................................... 12 55651

(51) Int. Cl.
*B60N 3/10* (2006.01)
*B60R 7/04* (2006.01)

(52) U.S. Cl.
CPC .............. *B60N 3/105* (2013.01); *B60N 3/106* (2013.01); *B60R 7/04* (2013.01)

(58) Field of Classification Search
USPC .......... 217/64; 224/552, 548, 554, 926, 483, 224/539; 248/316.4, 313, 31.1, 309.1;
(Continued)

(56) References Cited

U.S. PATENT DOCUMENTS 202,732 A * 4/1878 Lees ...................... B42F 17/02
                                                        190/36
1,279,621 A * 9/1918 Webber ................... B42F 17/02
                                                        100/910
(Continued)

FOREIGN PATENT DOCUMENTS

DE   20 2006 002100 U1   6/2007
DE   10 2008 062278 A1   6/2010
GB       2 466 357 A     6/2010

OTHER PUBLICATIONS

International Search Report and Written Opinion issued in related PCT Application No. PCT/FR2013/051361; report dated Jun. 11, 2013.

*Primary Examiner* — J. Gregory Pickett
*Assistant Examiner* — Gideon Weinerth
(74) *Attorney, Agent, or Firm* — Miller, Matthias & Hull LLP

(57) ABSTRACT

Storage compartment for a vehicle comprising: a receptacle having an interior volume; a movable partition member that can be moved in a sliding direction and partitions said interior volume, and; a locking device for locking the partition member in the sliding direction, comprising a first locking member provided on the receptacle and suitable for engaging with a second locking member provided on the partition member; the partition member being movable in an unlocking direction perpendicular to the sliding direction between a locked position in which the first and second locking members engage and a sliding position in which the first and second locking members are disengaged from each other, and the compartment comprising an elastic member biasing the partition member towards the locked position.

16 Claims, 6 Drawing Sheets

(58) Field of Classification Search
USPC ........ 220/543, 737, 738, 550, 546; 211/175, 211/184, 71.04, 90.01; 296/37.8
See application file for complete search history.

(56) References Cited

U.S. PATENT DOCUMENTS

| | | | | |
|---|---|---|---|---|
| 1,891,522 A * | 12/1932 | Bullock | ................... | B42F 17/02 220/550 |
| 1,911,554 A * | 5/1933 | Davis | ...................... | B42F 17/02 220/542 |
| 1,948,935 A * | 2/1934 | Rand | ...................... | B42F 17/02 220/541 |
| 2,081,470 A * | 5/1937 | Vanderhoof | ............ | B42F 17/02 162/411 |
| 2,585,612 A * | 2/1952 | Abrahamson | ........... | B42F 17/02 220/546 |
| 3,612,337 A * | 10/1971 | Harger | .................... | B42F 17/12 101/47 |
| 3,913,777 A * | 10/1975 | Schoenly | ................ | B42F 17/02 220/550 |
| 4,067,630 A * | 1/1978 | Stark | ........................ | B42F 17/12 220/545 |
| 5,035,184 A * | 7/1991 | Bott | ........................ | B60P 7/135 104/121 |
| 5,161,700 A * | 11/1992 | Stannis | ..................... | B60R 7/02 211/175 |
| 5,383,793 A * | 1/1995 | Hsu | ...................... | H05K 7/1405 248/316.4 |
| 5,411,355 A * | 5/1995 | Gosnell | .................... | B60P 7/14 220/542 |
| 6,021,049 A * | 2/2000 | Thompson | ........... | H05K 7/1409 211/41.17 |
| 6,039,296 A * | 3/2000 | Nishina | .................... | B60N 3/10 224/926 |
| 6,644,901 B2 * | 11/2003 | Breckel | ................ | B61D 45/001 410/104 |
| 7,044,427 B2 * | 5/2006 | Eckenswiller | ......... | A47G 33/12 248/523 |
| 7,149,094 B2 * | 12/2006 | Li | ........................... | H05K 7/142 361/756 |
| 7,341,297 B2 * | 3/2008 | Nakamura | ............. | B60N 3/083 224/926 |
| 7,510,158 B1 * | 3/2009 | Terry | ..................... | B60N 3/106 220/529 |
| 7,717,276 B2 * | 5/2010 | Alves | ...................... | A47F 1/125 211/59.2 |
| 8,267,258 B2 * | 9/2012 | Allwright | ................ | B65H 1/00 211/59.3 |
| 8,556,092 B2 * | 10/2013 | Valiulis | ................... | A47F 5/005 108/61 |
| 2004/0124103 A1 * | 7/2004 | Berne | ................... | B42F 17/12 206/307 |
| 2005/0072889 A1 | 4/2005 | Park | | |
| 2006/0237612 A1 * | 10/2006 | Thomas | .................... | B60R 7/04 248/311.2 |
| 2010/0301051 A1 * | 12/2010 | Stoner | .................... | B60N 3/106 220/529 |
| 2012/0261935 A1 * | 10/2012 | Perez | ..................... | B60R 5/048 296/24.4 |
| 2014/0105782 A1 * | 4/2014 | Carette | .................... | A61L 2/26 422/1 |
| 2015/0001363 A1 * | 1/2015 | Bohlke | .................. | B60N 3/106 248/311.2 |
| 2015/0151661 A1 * | 6/2015 | Morel | ...................... | B60R 7/04 296/37.1 |
| 2016/0101718 A1 * | 4/2016 | Bohlke | .................. | B60N 3/106 296/37.8 |

* cited by examiner

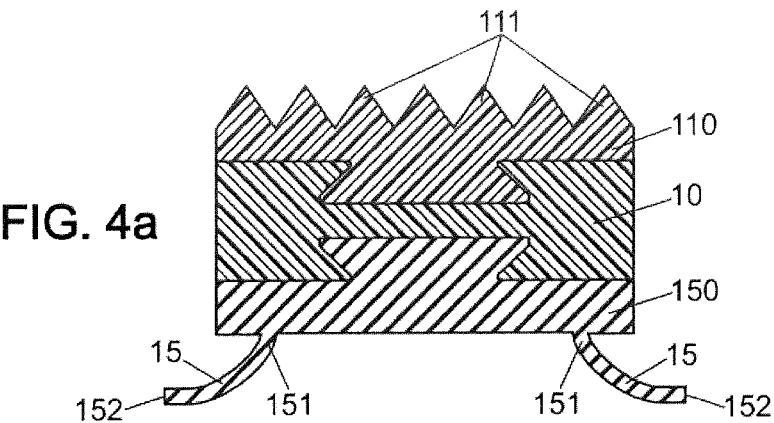
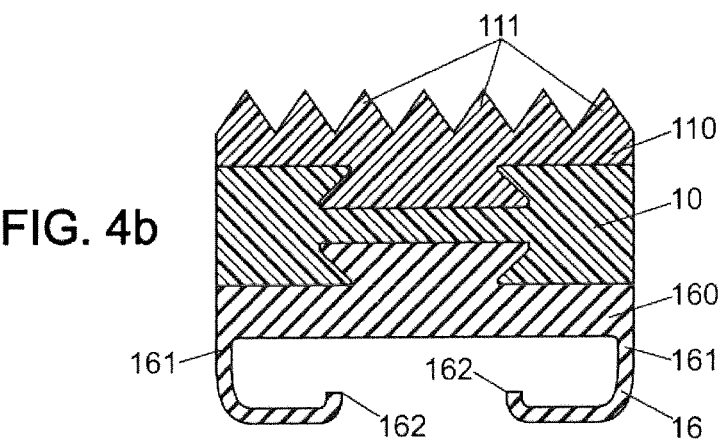
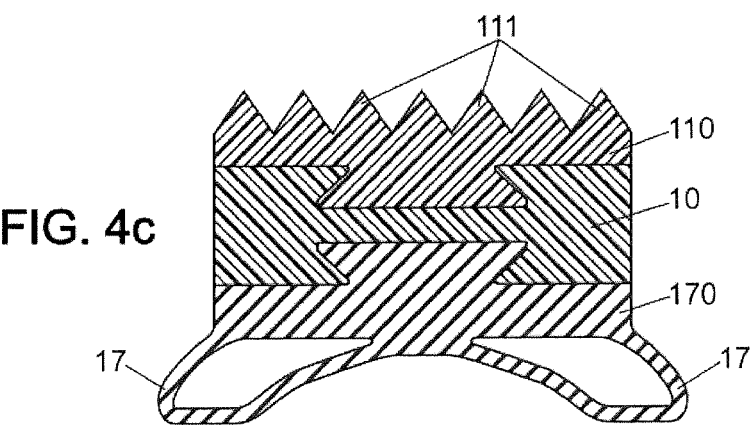

STORAGE COMPARTMENT FOR A VEHICLE PROVIDED WITH A MOVABLE PARTITION MEMBER

CROSS-REFERENCE TO RELATED APPLICATION

This Application is a 35 USC §371 US National Stage filing of International Application No. PCT/FR2013/051361 filed on Jun. 11, 2013, and claims priority under the Paris Convention to French Patent Application No. 12 55651 filed on Jun. 15, 2012

FIELD OF THE DISCLOSURE

The present invention concerns the field of storage compartments arranged inside a vehicle, for example in the passenger compartment within a center console, a door panel, or a dashboard, or in a trunk of the vehicle.

BACKGROUND OF THE DISCLOSURE

More particularly, the invention relates to a storage compartment for a vehicle, comprising:
  a receptacle having an interior volume, a bottom, and an opening situated opposite the bottom;
  at least one partition member slidably movable in a sliding direction and adapted to partition the interior volume of the receptacle; and
  a locking device for locking the partition member relative to the receptacle in the sliding direction, said locking device comprising a first locking member provided on one among the receptacle and partition member and adapted to engage with a complementary second locking member provided on the other among the receptacle and partition member.

Document US20070024075 describes an example of such a storage compartment located in a central console of the vehicle and in which a movable partition member is arranged to slide inside a receptacle and can be locked in the sliding direction in three specific positions relative to said receptacle, namely a position in which it substantially clears the entire opening of the receptacle, a position in which it partitions the opening into two substantially equal halves, and an intermediate position.

In that document, the partition member is guided as it slides by two guide grooves provided on the side walls of the receptacle and each having three positioning notches adapted to engage with projecting studs provided on the partition member to lock it in the sliding direction.

To change the partition member from one position to another, an occupant of the vehicle has to pull or push on the partition member along the sliding direction to cause an elastic deformation of the studs so that they exit the positioning notches. The partition member is freed by exerting a pulling or pushing force along the sliding direction on the partition member, this force causing the elastic deformation of at least one of the complementary locking members provided on the grooves and partition member.

Such a system is not without its drawbacks.

In particular, the force to be exerted on the partition member to release it from one of the locked positions must be great enough to cause elastic deformation of the locking studs provided on the partition member, which impacts the ease of use and the ergonomics of the storage compartment equipped with the partition member.

Moreover, with such a system, the repeated displacement of the partition member between the different partitioning configurations of the interior volume of the receptacle can dull the complementary locking members provided on the grooves and partition member, resulting in gaps between these elements. Such gaps can result in unstable and loose retention of the partition member in its partitioning configurations, which affects the perceived quality of the system and in particular can cause vibrational noises that are annoying to occupants of the vehicle.

The present invention is intended to overcome these disadvantages.

SUMMARY OF THE DISCLOSURE

To this end, the present invention proposes a storage compartment of the above type, characterized in that the partition member is movable in an unlocking direction substantially perpendicular to the sliding direction, between a locked position where the second locking member engages the first locking member and a sliding position where the second locking member is disengaged from the first locking member, and in that the compartment further comprises an elastic member biasing the partition member towards the locked position.

With these arrangements, the invention provides a storage compartment equipped with a partition member which exits the locked position and is moved along the sliding direction in a comfortable and ergonomic manner that reduces the force required for the user to operate it.

The invention further provides a storage compartment in which the locking of the partition member relative to the receptacle in the sliding direction is achieved in a reliable and durable manner.

Indeed, by adjusting the stiffness of the elastic member in the unlocking direction, one can precisely define a good compromise between the force necessary to unlock the partition member and the force required to maintain the partition member in the locked position.

According to an advantageous embodiment of the present invention, the storage compartment comprises a plurality of first locking members regularly distributed along the sliding direction.

In this manner, the invention provides a storage compartment equipped with a partition member which can assume various partitioning configurations of the interior volume of the receptacle to allow it to retain objects of different dimensions resting on the bottom of the receptacle, such as bottles or cups of different diameters, and for which the movement between different partitioning configurations is comfortable, ergonomic, and reduces the force required for the user to operate it.

In order to move the partition member along the sliding direction when in the locked position in a first partitioning configuration of the interior volume of the receptacle, the user first exerts a force on the partition member against the force exerted by the elastic member in order to move it from the locked position to the sliding position, and then moves this partition member along the sliding direction until the desired partitioning configuration of the interior volume of the receptacle is reached, suitable for retaining the objects to be placed inside the receptacle. The user then stops applying force on the partition member and said member is returned to the locked position relative to the receptacle due to the relaxation of the elastic member.

In preferred embodiments of the invention, it is possible to make use of one or more of the following arrangements:

the receptacle has first and second parallel side walls, and the partition member is guided along the sliding direction by first and second guide grooves provided respectively on the first and second side walls of the receptacle, the first locking member(s) being provided on at least said first groove, and the unlocking direction is substantially perpendicular to the bottom of the receptacle;

the first side wall of the receptacle comprises a flange extending into the interior of said receptacle and having a guide surface defining the opening, the first locking members are provided on said flange, the second locking member is provided on a lateral portion of the partition member, and the partition member has a shoulder defining a rotation-preventing surface adapted to face said guide surface regardless of the position of the partition member relative to the receptacle. With these arrangements, the guiding of the partition member relative to the receptacle is reinforced in both the sliding direction and the unlocking direction. Furthermore, the engaging of the guide surface provided on the flange of the side wall of the receptacle with the rotation-preventing surface provided on the separator prevents the partition member from pivoting about the axis defined by the unlocking direction relative to the receptacle, especially when in the sliding position, which could cause the partition member to become jammed in the receptacle and/or could prevent the first locking members provided on the receptacle from engaging with the second locking member provided on the partition member. Finally, the fact that the two guide and rotation-preventing surfaces remain facing each other, regardless of the relative position of the partition member and the receptacle, prevents the user manipulating the partition member from catching his or her fingers in the locking device, particularly when the partition member is in the sliding position.

the first locking members are in the form of a series of locking notches formed on a face of the first groove, the opposing face of said first groove being smooth and forming a sliding surface for the partition member, and the second locking member is in the form of at least one complementary locking projection provided on the partition member. In this manner, the storage compartment of the invention offers a large number of possible positions of the partition member relative to the receptacle, which allows it to be adjusted to the exact dimensions of an object placed in the interior volume of the receptacle.

the sliding surface of the first groove comprises a rib extending along the sliding direction and projecting from said sliding surface in the unlocking direction, and adapted to engage with a complementary groove provided on the partition member;

the notches of the series of locking notches are adjacent in the sliding direction;

the locking notches and the locking projection have a triangular profile. The triangular profile compensates for any misalignment of complementary locking members when the partition member is returned to the locked position by the effect of the elastic member. Alternatively, it may be arranged that the locking notches and the locking projection have a rounded, polygonal, or other profile.

the elastic member is fixed in the sliding direction of the partition member and bears against the sliding surface of the first groove.

the elastic member is in the form of a leaf spring;

the elastic member is in the form of a flexible strip having a first end connected to the partition member and a free second end, said flexible strip bearing against the sliding surface of the first groove via an end portion near said second end;

the elastic member is in the form of a deformable hollow chamber;

the second locking member is integral with a locking element fixed to the partition member by means of an assembly arrangement such as a dovetail joint, and/or the elastic member is integral with an elastic element fixed to the partition member by means of an assembly arrangement such as a dovetail joint. Thus, the materials constituting the elastic member, the second locking member, and the partition member can be adapted to their respective functions. For example, the elastic element can be made of elastomer or some other flexible material having the elasticity/stiffness which allow obtaining the desired compromise between the force required to release the partition member and the force required to maintain the partition member in the locked position. As for the locking element, it can be made of a relatively hard/rigid material to ensure that the partition member is solidly locked in the locked position by engagement with the first locking members provided on the receptacle. Finally, as the partition member itself is intended to be manipulated by a user, it can be made of a material that is sufficiently rigid to withstand such manipulation without excessive deformation, while feeling pleasant to the touch.

the elastic member bears against the sliding surface of the first groove via a sliding shoe rotatably mounted on the partition member.

the elastic member is in the form of a flexible tab comprising a first end connected to the sliding shoe and a free second end, said flexible tab bearing against the partition member via an end portion near said second end.

the partition member is moved from the locked position to the sliding position by being displaced towards the bottom of the receptacle;

the storage compartment comprises a plurality of partition members. The plurality of partition members allows offering a larger number of different partitioning configurations for the interior volume of the receptacle.

The invention also relates to a vehicle comprising a storage compartment as described above.

Furthermore, it is also possible to define a range of vehicles comprising a first set of vehicles comprising a storage compartment provided with one partition member and at least a second set of vehicles comprising a storage compartment provided with a plurality of partition members.

Other features and advantages of the invention will be apparent from the following description of one of its embodiments, given by way of non-limiting example with reference to the accompanying drawings.

BRIEF DESCRIPTION OF THE DRAWINGS

In the drawings:

FIGS. 4a to 4c are views similar to the one in FIG. 1a, illustrating an alternative embodiment of the partition member and different embodiments of the elastic member;

DETAILED DESCRIPTION OF THE DISCLOSURE

In the various figures, the same references denote identical or similar elements.

Figure 1:
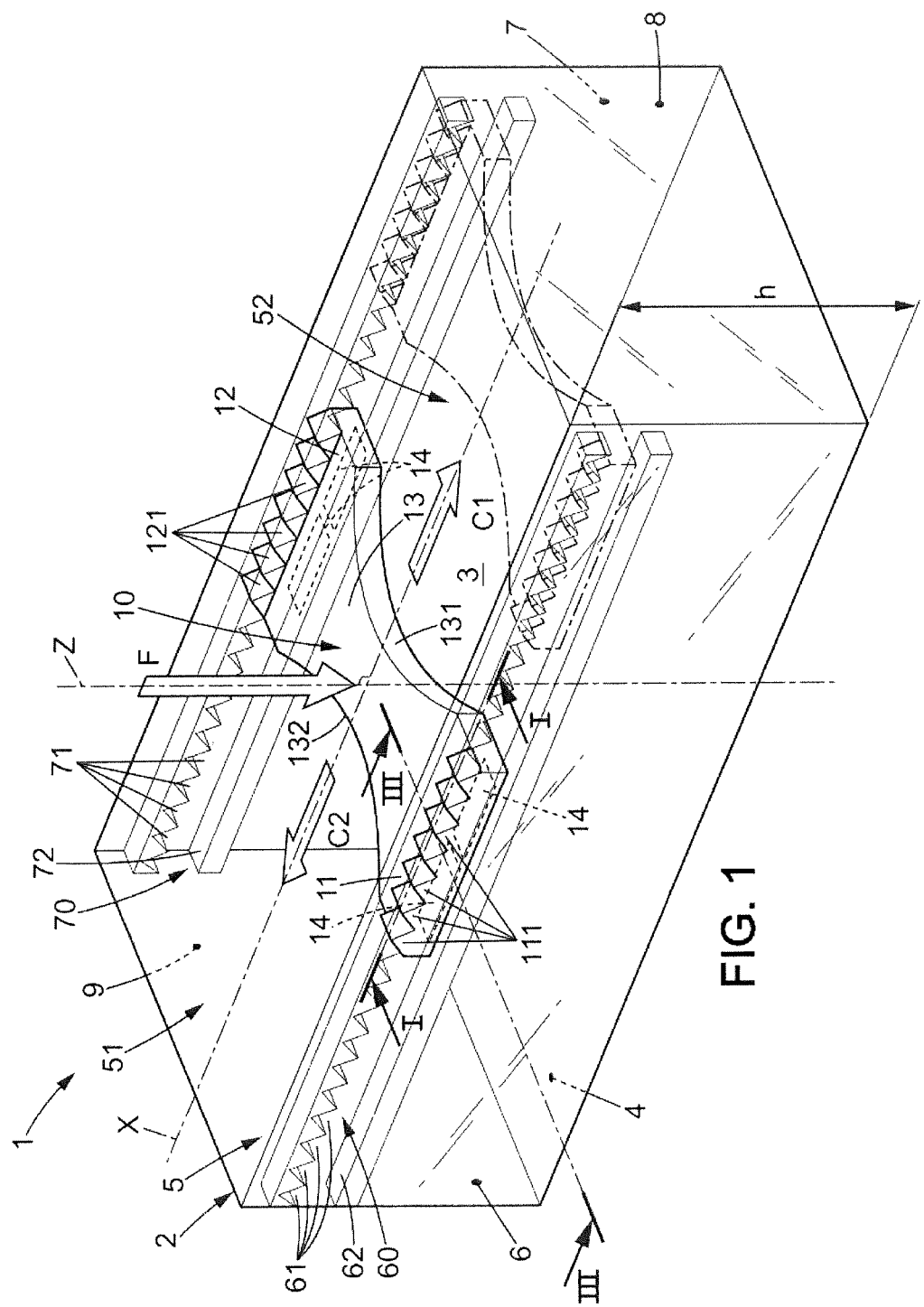
FIG. 1 is a schematic perspective view of a storage compartment according to the invention, comprising a single partition member.

FIG. 1 shows a storage compartment 1 according to the invention which can be arranged inside a motor vehicle, for example within the passenger compartment, in a center console extending between the front seats of the vehicle, in a dashboard, or in a panel in a front or rear door of the vehicle, and which is adapted to receive different objects, and in particular bottles or cups of different dimensions.

The compartment 1 comprises a receptacle 2 having an interior volume 3 for receiving objects, a bottom 4, and an upper opening 5 situated opposite the bottom 4. The receptacle 2, which is generally parallelepiped in shape, also has two parallel side walls 6, 7, as well as a front wall 8 and a rear wall 9, said side walls 6, 7, and front 8 and rear 9 walls together with the bottom 4 defining the interior volume 3 of the receptacle 2 (for clarity, the side wall 6 and the front wall 8 of the receptacle 2 are shown in phantom outline in FIG. 1).

In the exemplary embodiment illustrated in FIG. 1, the receptacle 2 is provided with a single partition member 10 arranged to be movable relative to the receptacle 2 in a sliding direction X parallel to the side walls 6, 7 of the receptacle, so as to partition the interior volume 3 of said receptacle.

More particularly, the partition member is in the form of a partitioning plate 10 arranged to be slidable between the side walls 6, 7 of the receptacle 2, in the vicinity of the opening 5 in the embodiment illustrated, and which can be locked in different configurations in which said plate 10 divides or partitions the interior volume 2 of the receptacle 3 at said opening 5.

For this purpose, the side walls 6, 7 of the receptacle 2 are each provided with a guide groove 60, 70 running near the opening 5, between the front and rear walls 8, 9 of the receptacle 2, and respectively adapted to receive a lateral portion 11, 12 of the partitioning plate 10.

The storage compartment 1 of the invention further comprises a locking device for locking the partition member 10 relative to the receptacle 2 in the sliding direction X, which allows immobilizing said partition member 10 in different partitioning configurations of the interior volume 3 of the receptacle 2.

Figure 1A:
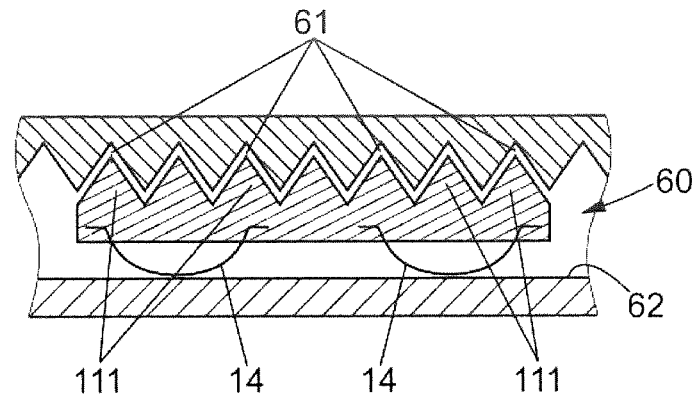
FIGS. 1a and 1b are partial sectional views along line I-I of FIG. 1, respectively showing the partition member in the locked position and in the sliding position relative to the receptacle of the storage compartment of the invention.
Figure 1B:
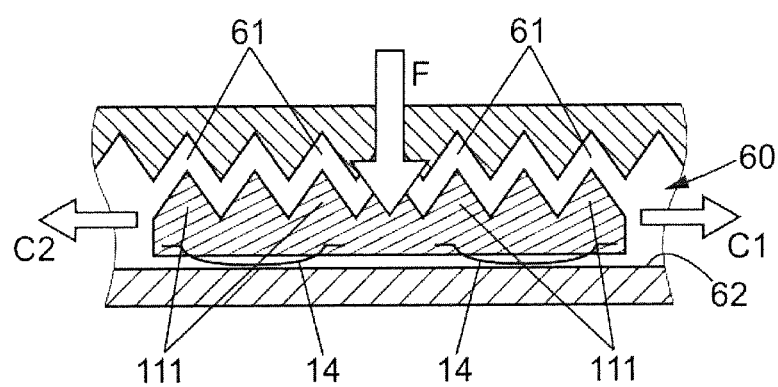

As can be seen in FIGS. 1, 1a, and 1b, the locking device comprises first locking members in the form of a continuous series of adjacent locking notches 61, 71 having triangular profiles formed on the upper face of each guide groove 60, 70 provided on the walls of the receptacle 2, and uniformly distributed along the guide direction X. These locking notches 61, 71, which together form a rack-like structure on the upper face of each groove 60, 70, are adapted to engage by form-fitting with second locking members in the form of locking projections 111, 121 having triangular profiles provided on the upper faces of the lateral portions 11, 12 of the partitioning plate 10.

In the illustrated embodiment, each of the guide grooves 60, 70 is provided with a series of locking notches 61, 71 and each of the lateral portions 11, 12 of the partitioning plate 10 is provided with complementary locking projections 111, 121. However, it is possible to provide such a series of locking notches in only one of the guide grooves, the other groove then having smooth surfaces and only serving to guide the partitioning plate 10; only one lateral portion of the partitioning plate 10 will then be equipped with complementary locking projections.

In the illustrated embodiment, the lateral portions 11, 12 of the partitioning plate 10 are each provided with seven locking projections 111, 121 adapted to engage with complementary locking notches 61, 71 provided on the guide grooves 60, 70 of the receptacle. Although it is advantageous to provide a plurality of locking projections on the partitioning plate 10, in particular in terms of the stability of the locked plate 10 relative to the receptacle 2, it is possible to provide only one locking projection on each of the lateral portions 11, 12 of the plate 10 to perform the function of locking the plate 10 relative to the receptacle 2 in the sliding direction X.

According to the invention, the partitioning plate 10 is also movable in an unlocking direction Z substantially perpendicular to the sliding direction X, between a locked position where the locking projections 111, 121 of the plate 10 engage with the locking notches 61, 71 of the guide grooves 60, 70 of the receptacle 2, and a sliding position in which said projections 111, 121 are clear of said notches 61, 71 and the plate 10 can be moved along the sliding direction X relative to the receptacle 2.

These locked and sliding positions are respectively illustrated in FIGS. 1a and 1b which represent partial sectional views along line I-I of FIG. 1, showing the engaging of a lateral portion 11 of the partitioning plate 10 with an associated guide groove 60 of the receptacle 2. It is understood that the other lateral portion 12 of the partitioning plate 10 engages in the same manner with the associated guide groove 70 of the receptacle 2.

As is clearly visible in FIGS. 1, 1a, and 1b, the lower faces of the lateral portions 11, 12 of the partitioning plate 10 are each equipped with two elastic members 14 biasing the partitioning plate 10 toward the locked position. In the abovementioned figures, the elastic members are in the form of leaf springs 14 integral with the lateral portions 11, 12 of the partitioning plate 10 along the sliding direction X and having convex central portions bearing against the smooth lower faces of the associated guide grooves 60, 70, these lower faces forming sliding surfaces 62, 72 for the partitioning plate 10 in the sliding position.

Thus, when an occupant of the vehicle wishes for example to move the partitioning plate 10 from its configuration indicated by solid lines in FIG. 1, where said plate 10 divides the opening 5 of the receptacle 2 into two substantially equal parts that are separate openings 51, 52, to the configuration illustrated with dashed lines in FIG. 1, where the partitioning plate 10 is adjacent to the front wall 8 of the receptacle 2 and essentially clears the opening 5, the user first exerts a force F on the plate 10 to move said plate towards the bottom 4 of the receptacle 2 against the force exerted by the leaf springs 14.

During this movement, the leaf springs 14 are compressed against the smooth lower faces of the guide grooves 11, 12, and the locking projections 111, 121 of the partitioning plate 10 exit the locking notches 61, 71 provided on the upper faces of the guide grooves 11, 12.

The partitioning plate 10 is then in the sliding position shown in FIG. 1b, and the vehicle occupant, while maintaining the force F, can freely move the plate 10 relative to the receptacle along the sliding direction X as indicated by arrows C1 and C2, until the desired partitioning configuration of the opening 5 is reached (here the configuration where the partitioning plate 10 is adjacent to the front wall 8 of the receptacle 2 and is leaving the opening 5 substantially clear).

The vehicle occupant then stops applying the force F and the partitioning plate 10 moves away from the bottom 4 of the receptacle due to the relaxation of the leaf springs 14, and the locking projections 111, 121 engage with the locking notches 61, 71 of the guide grooves 60, 70 to lock the partitioning plate 10 in the sliding direction X in the desired partitioning configuration of the opening 5 of the receptacle 2.

The providing of a continuous series of adjacent locking notches 61, 71 regularly distributed along the sliding direction X, on the upper faces of the guide grooves 60, 70 of the receptacle 2, allows offering the vehicle occupant the possibility of positioning the partitioning plate 10 in a large number of partitioning configurations of the opening 5 of the receptacle 2, and thereby defining opening areas whose dimensions are suitable for retaining objects of different dimensions, such as bottles or cups of different diameters, resting on the bottom 4 of the receptacle 5 and protruding through the opening 5. The continuous series of adjacent locking notches 61, 71, regularly distributed along the sliding direction X, also allows the storage compartment of the invention to be equipped in a simple manner with a plurality of partitioning plates 10. No specific adaptation of the storage compartment 1 and in particular of the locking device is required in order to equip the storage compartment 1 with one or a plurality of partitioning plates 10, 10'.

Moreover, the triangular profile of the locking notches 61, 71 provided on the grooves 60, 70 of the receptacle 2, and of the complementary projections 111, 121 provided on the partitioning plate 10, allows compensating for any misalignment between these components when the vehicle occupant releases the force F being exerted on the plate 10 while moving it in the sliding position and it is returned to the locked position due to the effect of the leaf springs 14.

Figure 2A:
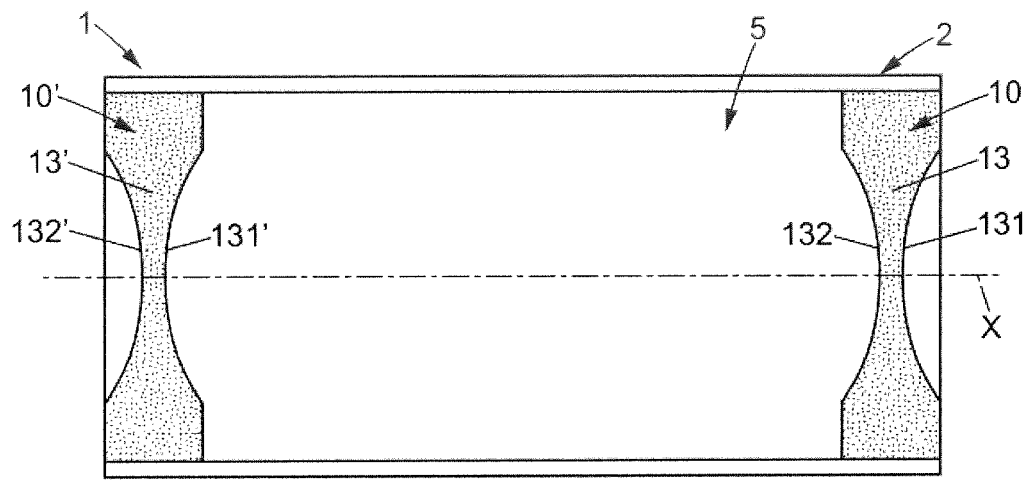
FIGS. 2a to 2c illustrate a top view of three examples of using a variant of the storage compartment of the invention having two partition members.
Figure 2B:
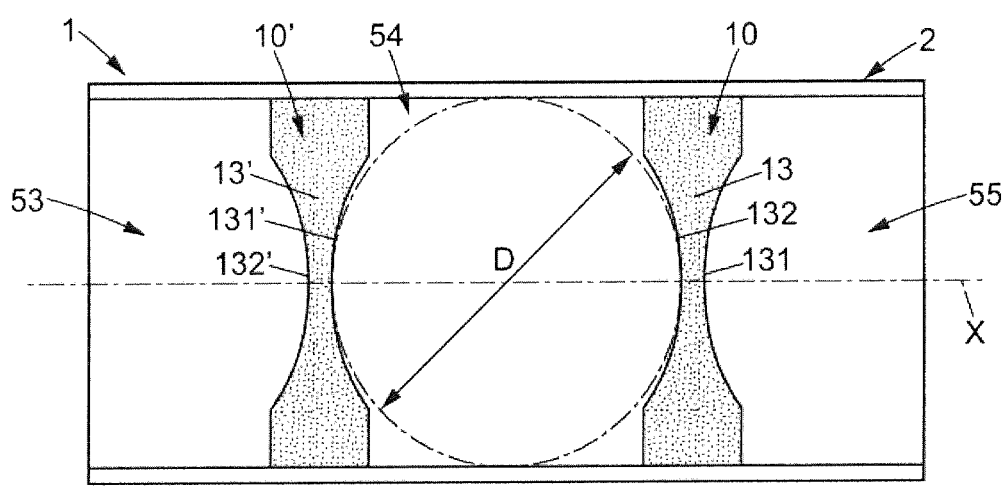
Figure 2C:
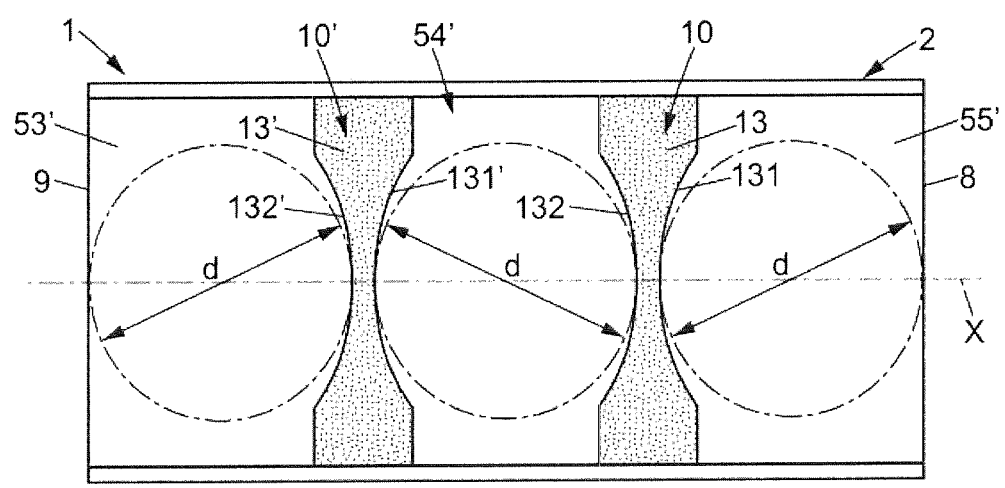

FIGS. 2a to 2c schematically illustrate a top view of a storage compartment 1 of the invention equipped with two partitioning plates 10, 10' positioned in different partitioning configurations of its opening 5, relative to the receptacle 2. Advantageously, the partitioning plates 10, 10' are identical, which is of particular interest from a cost aspect.

Thus, in FIG. 2a, the partitioning plates 10, 10' are positioned and locked relative to the receptacle 2 so as to maximize the opening 5 and allow optimal access to the interior volume of the receptacle 2 while removing and/or placing objects.

In FIG. 2b, the partitioning plates 10, 10' have been moved along the sliding direction X and are locked relative to the receptacle 2 so as to divide the opening 5 into three opening areas 53, 54, 55, of which the central portion 54 is suitable for accepting an object such as a bottle, indicated by a dashed line, having a certain diameter D and resting on the bottom of the receptacle, being retained in the sliding direction X by the partitioning plates 10, 10'.

In FIG. 2c, the partitioning plates 10, 10' have been moved along the sliding direction X and are locked relative to the receptacle 2 so as to divide the opening 5 into three opening areas 53', 54', 55' of substantially equal size and each suitable for accepting an object such as a cup, indicated by a dashed line, having a certain diameter d and resting on the bottom of the receptacle, being retained in the sliding direction X either between the partitioning plates 10, 10', or between a partitioning plate 10, 10' and the front or rear walls 8, 9 of the receptacle 2.

As shown in FIGS. 1 and 2a to 2c, the partitioning plate or plates 10, 10' preferably have arc-shaped indentations 131, 132, 131', 132' in their central areas 13, 13', adapted to at least partially fit against the contours of the objects placed inside the receptacle 2, such as bottles or cups of different diameters.

Although in the embodiment illustrated, the guide grooves 60, 70 for the partitioning plate or plates 10, 10' have been provided near the opening 5 of the receptacle 2 so that said partitioning plates 10, 10' can retain, and prevent from moving in the sliding direction X, objects resting on the bottom 4 of the receptacle and protruding through the opening 5, one could consider positioning these grooves 60, 70, and therefore the partitioning plates 10, 10', more towards the bottom 4 of the receptacle 2, and in particular at half the height h of the receptacle 2 such that said partitioning plates 10, 10' allow retaining, and preventing from moving in the sliding direction X, objects resting on the bottom 4 of the receptacle but not necessarily protruding through the opening 5.

Figure 3A:
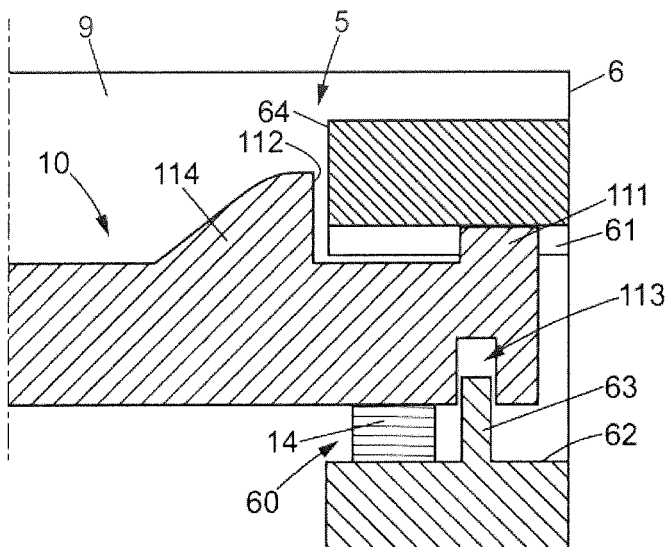
FIGS. 3a and 3b are partial sectional views along line III-III of FIG. 1, illustrating details of the storage compartment of the invention with the partition member respectively in the locked position and sliding position relative to the receptacle.
Figure 3B:
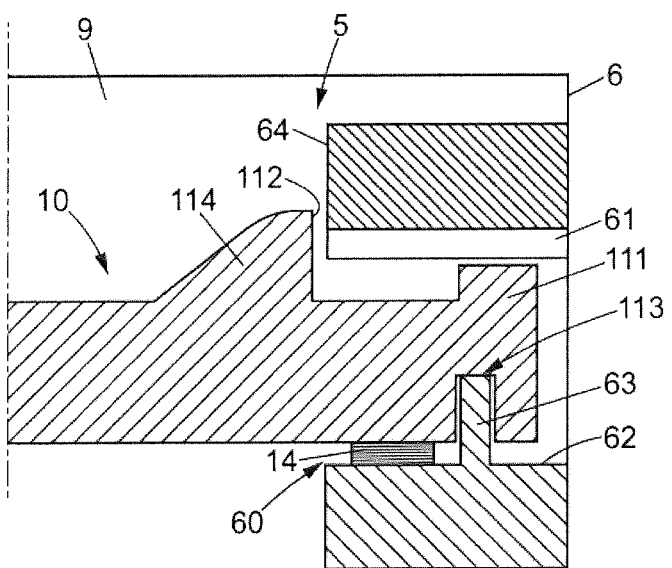

We will now describe the details of the storage compartment according to the invention with reference to FIGS. 3a and 3b in which the partition member 10 is respectively in the locked position and the sliding position relative to the receptacle 2.

More specifically, these FIGS. 3a and 3b are intended to illustrate details of guiding the partition member 10 in its movement relative to the receptacle in the unlocking Z and sliding X directions.

Although these FIGS. 3a and 3b illustrate the guiding by one of the guide grooves, it is understood that, by symmetry, the same can be true for the other of the guide grooves.

It can thus be seen in FIGS. 3a and 3b that the sliding surface 62 of the first groove 60 may advantageously be provided with a rib 63 running longitudinally along the sliding direction X and protruding from this sliding surface 62 in the unlocking direction Z. The rib 63 thus formed on the sliding surface 62 is adapted to be received within a complementary groove 113 provided in the partition member 10, and more specifically in the present case in a lower face of the lateral portion 11 of the partition member 10.

The implementation of such a system of receiving a rib 63 within a groove 113 reinforces the guiding of the partition member 10 in its movement relative to the receptacle in the unlocking Z and sliding X directions.

The rib 63 may also serve as a stop preventing movement of the partition member 10 in the unlocking direction Z by contact with the bottom of the groove 113 as shown in FIG. 3b.

Moreover, still in relation to FIGS. 3a and 3b, one can see that the side wall 6 of the receptacle 2 comprises a flange extending inwardly into the receptacle 2 and having a guide surface 64 defining the opening 5 of said receptacle 2. The first locking members 61 are provided on said flange. The partition member 10 is provided with a shoulder defined by a projection 114 extending longitudinally along the sliding direction X and projecting from the upper face of the partition member 10 in the unlocking direction Z. This shoulder defines a rotation-prevention surface 112 on the partition member 10, adapted to positioned facing the guiding surface 64 defined on the flange of the side wall 6 so as to prevent the partition member from pivoting about the axis defined by the unlocking direction Z, especially when the partition member 10 is in the sliding position relative to the receptacle 2, such pivoting likely to cause the partition member 10 to jam in the sliding direction X.

Furthermore, and as can be seen in FIGS. 3*a* and 3*b*, the dimensions and/or relative positioning of the guide surface 64 and the rotation-prevention surface 112 are selected such that the guide surface 64 is facing the rotation-prevention surface 112 regardless of the position of the partition member 10 relative to the receptacle 2, in particular in the unlocking direction Z. Such an arrangement is particularly advantageous for preventing a user manipulating the partition member 10 from accessing the locking device formed of notches 61 provided on the groove 60 and of projections 111 provided on the lateral portion 11 of the partition member 10, and from catching his or her fingers within said device, especially when the partition member 10 is in the sliding position relative to the receptacle 2. Moreover, the risk of foreign elements entering the locking device is thus limited, as such elements could interfere with the proper operation of the locking device.

Similarly, and as can be seen in these FIGS. 3*a* and 3*b*, it is possible to size the rib 63 and groove 113 so that the rib 63 remains at least partially housed within the groove 63 regardless of the relative position of the partition member 10 and the receptacle 2, in particular in the unlocking direction Z.

FIGS. 4*a* to 4*c* illustrate a variant embodiment of the partition member 10 that is an alternative to the partition member 10 shown in FIGS. 1, 1*a*, and 1*b*. In these FIGS. 4*a* to 4*c*, analogous to FIG. 1*a*, the groove 60 is not shown. In this embodiment, the second locking members are in the form of triangular projections 111, 121 which are part of a locking element and the elastic members are part of an elastic element, said locking element and said elastic element being placed on the lateral portions 11, 12 of the partition member 10.

Specifically, according to this embodiment and as can be seen in these FIGS. 4*a* to 4*c*, the locking projections 111 are integral with a locking element 110 fixed to a lateral portion 11 of the partition member 10 by means of a dovetail assembly. In this variant embodiment, the locking member 110 and the partition member 10 can advantageously be made from different materials appropriate to their respective functions.

Similarly, according to this variant embodiment, the elastic members 15, 16, 17 are integral with an elastic element 150, 160, 170 fixed to a lateral portion 11 of the partition member 10 by means of a dovetail assembly. In this variant embodiment, the elastic element 150, 160, 170 and the partition member 10 can advantageously be made from different materials appropriate to their respective functions.

FIGS. 4*a* to 4*c* also differ from each other in the form of the elastic members 15, 16, 17 supported by each elastic element 150, 160, 170.

Thus, in FIGS. 4*a* and 4*b*, each of the two elastic members located at the lateral portion 11 of the partition member 10 is in the form of an elastic strip 15, 16 having a first end 151, 161 connected to the partition member 10 via the associated elastic element 150, 160 and a free second end 152, 162.

Each of these elastic strips 15, 16 is intended to bear against the sliding surface 62 of the associated groove 60 by means of an end portion located near their free end 152, 162.

In the variant embodiment illustrated in FIG. 4*a*, the elastic strips 15 used extend toward the front and rear of the partition member 10 along the sliding direction X, and their free ends 152 extend away from each other along said sliding direction X. Such an arrangement of the elastic strips 15 promotes stability of the partition member 10.

In the variant embodiment illustrated in FIG. 4*b*, the elastic strips 16 used extend toward the center of the partition member 10 along the sliding direction X and their free ends 152 lie substantially facing one another along the sliding direction X. Such an arrangement of the elastic strips 16 promotes compactness of the partition member 10 along the sliding direction X.

Finally, in the variant embodiment shown in FIG. 4*c*, the elastic members used are in the form of deformable hollow chambers 17. These hollow chambers 17 are enclosed, and thus limit the entry of foreign elements that could hinder the movement of the partition member 10, particularly in the unlocking direction Z.

Figure 5A:
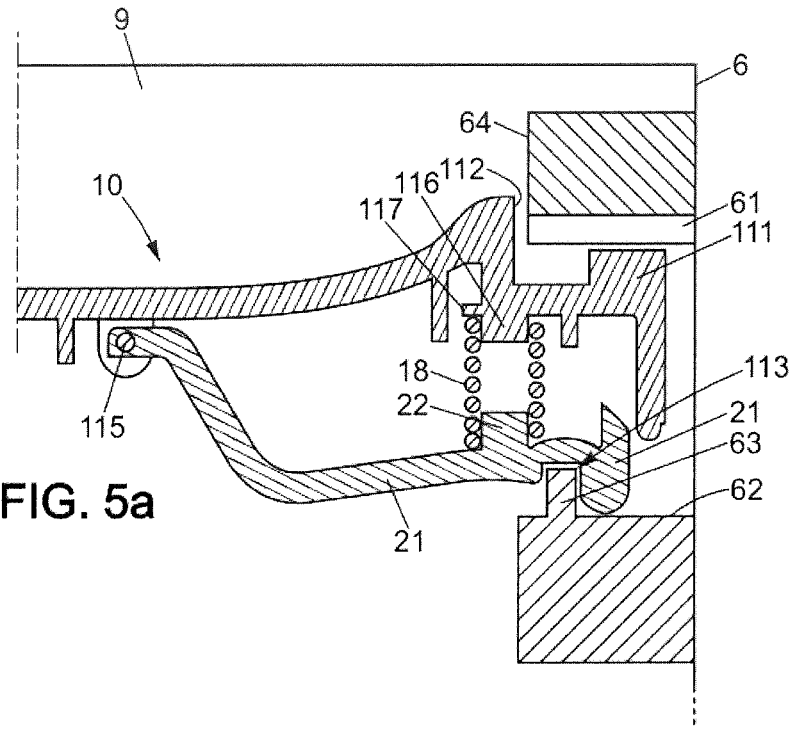
FIGS. 5a and 5b are views similar to the one in FIG. 3b, illustrating variant embodiments of the storage compartment of the invention in which the elastic member is interposed between the partition member and a sliding shoe pivotally mounted on the partition member.
Figure 5B:
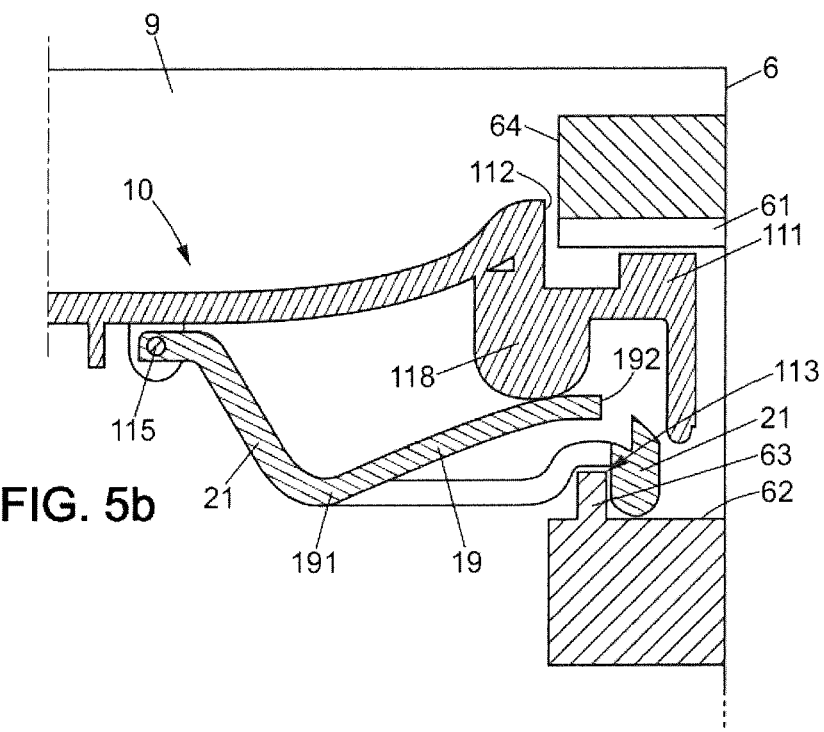

FIGS. 5*a* and 5*b* illustrate views, analogous to the one in FIG. 3*b*, of two variant embodiments of the storage compartment of the invention in which the elastic member or members used do not bear directly against the sliding surfaces 62, 72 defined in the grooves 60, 70.

More specifically, in both these embodiments of the invention, the elastic members used in the storage compartment do not bear on the sliding surfaces defined in the grooves directly, but via a sliding shoe rotatably mounted on the partition member 10.

Thus, and as can be seen in these FIGS. 5*a* and 5 *b* partially representing the partition member 10 in a sliding position relative to the receptacle 2, a sliding shoe 21 is rotatably mounted on a pin 115 supported by the partition member 10 and extending along the sliding direction X in the embodiments represented in these figures. Alternatively, it could be arranged so that the pin 115 extends in a lateral direction perpendicular to the sliding X and unlocking Z directions, the essential point being that the sliding shoe 21 has mobility in the unlocking direction Z relative to the partition member 10.

One will note that in these two embodiments illustrated in FIGS. 5*a* and 5*b*, the groove 113 accommodating the rib 63 provided on the sliding surface 62 is defined in the sliding shoe 63, thereby enhancing the guiding of said shoe 21 in the sliding direction X, the shoe 21 being held in contact with the sliding surface 62 and with the rib 63 by the elastic member as will be described in more detail below.

In both variant embodiments illustrated in FIGS. 5*a* and 5*b*, the elastic member extends between the partition member 10 and the sliding shoe 21 and biases these two elements apart from each other in the unlocking direction Z.

In the embodiment illustrated in FIG. 5*a*, the elastic member is in the form of a coil spring 18 received within an inner space defined by the partition member 10 and the sliding shoe 21, for which the displacement in the unlocking direction Z is guided by means of a pin 22 provided on the sliding shoe 21 and a pin 115 equipped with a support flange 117 provided on the partition member 10.

In the embodiment illustrated in FIG. 5*b*, the elastic member is in the form of a flexible tab 19 connected with and in this case integral with the sliding shoe 21. This flexible tab 19 has a first end 191 connected to the sliding shoe 21 and a free second end 192. The flexible tab 19 forming the elastic member of this variant embodiment bears against a support pin 118 provided on the partition member 10 at an end portion near the second end 192.

The invention claimed is:

1. A storage compartment for a vehicle, comprising:
   a receptacle having an interior volume, a bottom, and an opening situated opposite the bottom;
   at least one partition member slidably movable in a sliding direction and adapted to partition the interior volume of the receptacle, and;
   a locking device for locking the partition member relative to the receptacle in the sliding direction, said locking device comprising a first locking member provided on one among the receptacle and partition member and adapted to engage with a complementary second locking member provided on the other among the receptacle and partition member;
   wherein the entire partition member is movable towards the bottom of the receptacle, in an unlocking direction substantially perpendicular to the sliding direction, between a locked position where the second locking member engages the first locking member and a sliding position where the second locking member is disengaged from the first locking member,
   and wherein the compartment further comprises an elastic member biasing the partition member toward the locked position.

2. The storage compartment according to claim 1, comprising a plurality of first locking members regularly distributed along the sliding direction.

3. The storage compartment according to claim 2, wherein the receptacle has first and second parallel side walls, wherein the partition member is guided along the sliding direction by first and second guide grooves provided respectively on the first and second side walls of the receptacle, the first locking members being provided on at least said first groove, and wherein the unlocking direction is substantially perpendicular to the bottom of the receptacle.

4. The storage compartment according to claim 3, wherein:
   the first side wall of the receptacle comprises a flange extending into the interior of said receptacle and having a guide surface defining the opening,
   the first locking members are provided on said flange,
   the second locking member is provided on a lateral portion of the partition member, and
   the partition member has a shoulder defining a rotation-preventing surface adapted to face said guide surface regardless of the position of the partition member relative to the receptacle.

5. The storage compartment according to claim 3, wherein the first locking members are in the form of a series of locking notches formed on a face of the first groove, the opposing face of said first groove being smooth and forming a sliding surface for the partition member, and wherein the second locking member is in the form of at least one complementary locking projection provided on the partition member.

6. The storage compartment according to claim 5, wherein the sliding surface of the first groove comprises a rib extending along the sliding direction and projecting from said sliding surface in the unlocking direction, and adapted to engage with a complementary groove provided on the partition member.

7. The storage compartment according to claim 5, wherein the notches of the series of locking notches are adjacent in the sliding direction.

8. The storage compartment according to claim 5, wherein the elastic member is fixed in the sliding direction of the partition member and bears against the sliding surface of the first groove.

9. The storage compartment according to claim 8, wherein the elastic member is in the form of a leaf spring.

10. The storage compartment according to claim 8, wherein the elastic member is in the form of a flexible strip having a first end connected to the partition member and a free second end, said flexible strip bearing against the sliding surface of the first groove via an end portion near said second end.

11. The storage compartment according to claim 8, wherein the second locking member is integral with a locking element fixed to the partition member by means of an assembly arrangement and/or the elastic member is integral with an elastic element fixed to the partition member by means of an assembly arrangement.

12. The storage compartment according to claim 8, wherein the elastic member bears against the sliding surface of the first groove via a sliding shoe rotatably mounted on the partition member.

13. The storage compartment according to claim 12, wherein the elastic member is in the form of a flexible tab comprising a first end connected to the sliding shoe and a free second end, said flexible tab bearing against the partition member via an end portion near said second end.

14. The storage compartment according to claim 1, wherein the partition member is moved from the locked position to the sliding position by being displaced toward the bottom of the receptacle.

15. The storage compartment according to claim 1, wherein the storage compartment comprises a plurality of partition members.

16. A vehicle comprising a storage compartment according to claim 1.

* * * * *